(12) United States Patent  (10) Patent No.: US 8,926,162 B2
Yu  (45) Date of Patent: Jan. 6, 2015

(54) BACKLIGHT MODULE AND LIQUID DISPLAY DEVICES WITH THE SAME

(75) Inventor: Gang Yu, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 197 days.

(21) Appl. No.: 13/640,737

(22) PCT Filed: Aug. 1, 2012

(86) PCT No.: PCT/CN2012/079479
§ 371 (c)(1),
(2), (4) Date: Oct. 12, 2012

(87) PCT Pub. No.: WO2014/015531
PCT Pub. Date: Jan. 30, 2014

(65) Prior Publication Data
US 2014/0029303 A1   Jan. 30, 2014

(30) Foreign Application Priority Data
Jul. 24, 2012   (CN) .......................... 2012 1 0257728

(51) Int. Cl.
*G02F 1/1333* (2006.01)
*F21V 8/00* (2006.01)
*G02F 1/1335* (2006.01)

(52) U.S. Cl.
CPC ........ *G02B 6/0088* (2013.01); *G02F 1/133608* (2013.01)
USPC .............................. 362/633; 362/615; 349/58

(58) Field of Classification Search
CPC .......... G02F 2201/465; G02F 2201/46; G02F 1/133608; G02B 6/0086; G02B 6/0088
USPC .............................. 362/615, 633, 634; 349/58
See application file for complete search history.

(56) References Cited

U.S. PATENT DOCUMENTS

| | | | | |
|---|---|---|---|---|
| 5,729,310 | A * | 3/1998 | Horiuchi et al. | 349/62 |
| 6,392,724 | B2 * | 5/2002 | An et al. | 349/58 |
| 2009/0009946 | A1 * | 1/2009 | Oomoto et al. | 361/681 |
| 2011/0096569 | A1 * | 4/2011 | Hamada | 362/613 |
| 2012/0170311 | A1 * | 7/2012 | Huang et al. | 362/611 |

* cited by examiner

*Primary Examiner* — Peggy Neils
(74) *Attorney, Agent, or Firm* — Andrew C. Cheng (57) ABSTRACT

A backlight module including a back frame, a light guiding plate received in the back frame, and a position piece is disclosed. The position piece is arranged between the back frame and the light guiding plate, and the position piece is detachably fixed on sidewalls of the back frame to firmly press the light guiding plate within the back frame. In addition, a liquid crystal display with the backlight module is also disclosed. The light guiding plate is reliably positioned by adopting the above position piece.

16 Claims, 6 Drawing Sheets

BACKLIGHT MODULE AND LIQUID DISPLAY DEVICES WITH THE SAME

BACKGROUND OF THE INVENTION

1. Field of the Invention

Embodiments of the present disclosure relate to display technology, more particularly to backlight modules and liquid display devices with the same.

2. Discussion of the Related Art

Figure 1:
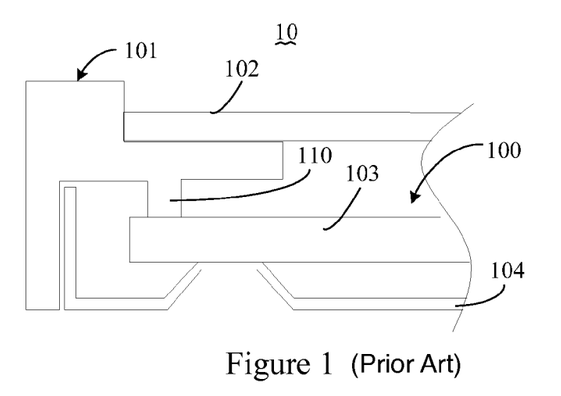
FIG. 1 is a schematic view of the structure of a conventional liquid crystal device.

Liquid crystal devices have been broadly used nowadays. FIG. 1 is a schematic view of the structure of a common liquid crystal display. As shown in FIG. 1, the liquid crystal display 10 includes a backlight module 100, a middle frame 101, and a panel 102. The backlight module 100 includes a light guiding plate 103, a back frame 104 and an abutting portion 110. The light guiding plate 103 is received in the back frame 104 and is fixed by the abutting portion 110.

However, as the middle frame 101 is generally made by plastic materials with weaker strength, positioning effect of the abutting portion 110 of the middle frame 101 is thus weaker. The positioning effect may be weaker and weaker as the design of the liquid crystal devices becomes thinner.

SUMMARY

The object of the claimed invention is to provide a backlight module having a light guiding plate reliably positioned therein, and liquid crystal devices with the backlight module.

In one aspect, the backlight module includes a back frame, a light guiding plate received in the back frame, and a position piece arranged between the back frame and the light guiding plate. The position piece is detachably fixed on sidewalls of the back frame to firmly press the light guiding plate within the back frame. The position piece includes a supporting portion, and a fixing portion and an abutting portion respectively arranged in opposite sides of the supporting member. The fixing portion and the abutting portion are spaced apart in an extended direction of the supporting portion and are vertically connected with the supporting portion.

The abutting portion includes a pressing platform with a bottom surface pressing a top surface of the light guiding plate. The fixing portion includes a protrusion detachably fixed on sliding slots on the sidewalls of the back frame.

The sliding slots include a titled sliding slot and a horizontal sliding slot connected to an end of the titled sliding slot.

The position piece further includes a reinforcing portion. The reinforcing portion includes a first strengthen portion, a second strengthen portion and a third strengthen portion. The first strengthen portion is connected horizontally with the abutting portion and extending in an opposite direction with the abutting portion. The second strengthen portion is arranged between the supporting portion and the protrusion. The third strengthen portion is arranged in the same side of the supporting portion and between the first strengthen portion and the second strengthen portion. The first strengthen portion, the second strengthen portion and the third strengthen portion are parallel and spaced apart from each other in an extended direction of the supporting portion.

A groove arranged on a top edge of the horizontal sliding slot recesses in an opposite direction toward a down edge of the horizontal sliding slot, and is arranged in an opposite direction toward the titled sliding slot.

In another aspect, the backlight module includes a back frame, a light guiding plate received in the back frame, and a position piece. The position piece is arranged between the back frame and the light guiding plate and is detachably fixed on sidewalls of the back frame to firmly press the light guiding plate within the back frame.

The position piece includes a supporting portion, and a fixing portion and an abutting portion respectively arranged in opposite sides of the supporting member. The fixing portion and the abutting portion are spaced apart in an extended direction of the supporting portion and are vertically connected with the supporting portion.

The abutting portion includes a pressing platform with a bottom surface pressing a top surface of the light guiding plate. The fixing portion includes a protrusion detachably fixed on sliding slots on the sidewalls of the back frame.

The sliding slots include a titled sliding slot and a horizontal sliding slot connected to an end of the titled sliding slot.

A groove arranged on a top edge of the horizontal sliding slot recesses in an opposite direction toward a down edge of the horizontal sliding slot, and is arranged in an opposite direction toward the titled sliding slot.

A distance between a top of the groove and a down edge of the horizontal sliding slot is substantially the same with the diameter of the protrusion.

The height of the titled sliding slot and the height of the horizontal sliding slot are substantially smaller than the diameter of the protrusion.

In another aspect, a liquid crystal display includes a back frame, a light guiding plate received in the back frame, and a position piece arranged between the back frame and the light guiding plate, and a panel arranged on a top surface of the position piece. The position piece is detachably fixed on sidewalls of the back frame to firmly press the light guiding plate within the back frame.

The position piece includes a supporting portion, a fixing portion and an abutting portion respectively arranged in opposite sides of the supporting member. The fixing portion and the abutting portion are spaced apart in an extended direction of the supporting portion and are vertically connected with the supporting portion.

The abutting portion includes a pressing platform with a bottom surface pressing a top surface of the light guiding plate. The fixing portion includes a protrusion detachably fixed on sliding slots on the sidewalls of the back frame.

The sliding slots include a titled sliding slot and a horizontal sliding slot connected to an end of the titled sliding slot.

A groove arranged on a top edge of the horizontal sliding slot recesses in an opposite direction toward a down edge of the horizontal sliding slot, and is arranged in an opposite direction toward the titled sliding slot.

A distance between a top of the groove and a down edge of the horizontal sliding slot is substantially the same with the diameter of the protrusion.

The height of the titled sliding slot and the height of the horizontal sliding slot are substantially smaller than the diameter of the protrusion.

By fixing the detachably position piece on sidewalls on the back frame and the light guiding plate, the light guiding plate is firmly pressed within the back frame as that the light guiding plate is reliably positioned.

DETAILED DESCRIPTION OF THE EMBODIMENTS

Figure 2:
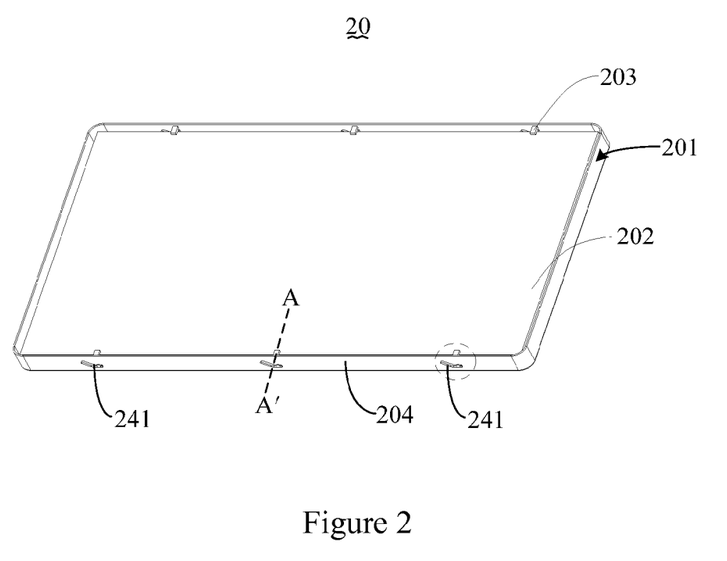
FIG. 2 is a schematic view of the structure of the backlight module of one embodiment.

FIG. 2 is a schematic view of a structure of a backlight module 20 of one embodiment of the claimed invention. As shown in FIG. 2, the backlight module 20 includes a back frame 201, a light guiding plate 202, and a position piece 203.

In one embodiment, the back frame 201 is rectangle-shaped body, including a bottom surface and four sidewalls 204 vertical to the bottom surface. The back frame 201 may be formed by assembling several pieces or by assembling a sheet-shaped bottom surface and sidewalls. In one embodiment, the back frame 201 is for receiving optical components, such as the light guiding plate 202. In addition, the light guiding plate 202 is spaced apart from the sidewalls 204 of the back frame 201 so that the position piece 203 may be arranged therebetween.

In the embodiment, the position piece 203 is arranged between the back frame 201 and the light guiding plate 202. The position piece 203 may be detachably fixed on the sidewalls 204 of the back frame 201 to firmly press the light guiding plate 202 within the back frame 201. The structure of the position piece 203 is shown as in FIG. 3.

Figure 3:
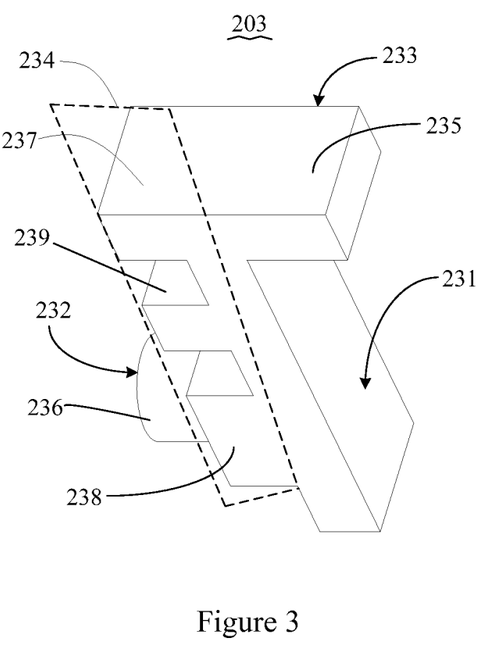
FIG. 3 is a schematic view of the structure of the abutting portion of one embodiment.

FIG. 3 is a schematic diagram showing one embodiment of the position piece 203 of FIG. 2. The position piece 203 includes a supporting portion 231, a fixing portion 232, an abutting portion 233 and a reinforcing portion 234. In the embodiment, the fixing portion 232 and the abutting portion 233 are arranged in opposite sides of the supporting portion 231. In addition, the fixing portion 232 and the abutting portion 233 are spaced apart and are vertically connected with the supporting portion 231 respectively.

The abutting portion 233 includes a rectangular-shaped pressing platform 235 with a top surface (not labeled) and a bottom surface (not labeled). The fixing portion 232 includes a cylinder-shaped protrusion 236 made by plastic material. The protrusion 236 may be slightly deformed due to forces and thus may be easily assembled and disassembled. The reinforcing portion 234 further includes a first strengthen portion 237, a second strengthen portion 238, and a third strengthen portion 239. The reinforcing portion 234 increases the strength of the position piece 203, and the concrete structure of the reinforcing portion 234 is not limited to the disclosure of the invention.

In the embodiment, the first strengthen portion 237, the second strengthen portion 238 and the third strengthen portion 239 are rectangular-shaped, and are parallel and spaced apart from each other in an extended direction of the supporting portion 231. The first strengthen portion 237 horizontally connects with the abutting portion 233 and extends in an opposite direction with the abutting portion 233. The size of the first strengthen portion 237 is substantially the same with the size of the pressing platform 235 of the abutting portion 233. The second strengthen portion 238 is arranged between the supporting portion 231 and the protrusion 236. The third strengthen portion 239 and the second strengthen portion 238 are arranged in the same side of the supporting portion 231. In addition, the third strengthen portion 239 is arranged between the first strengthen portion 237 and the second strengthen portion 238. Lengths of the first strengthen portion 237, the second strengthen portion 238, and the third strengthen portion 239 are substantially the same.

Figure 4:
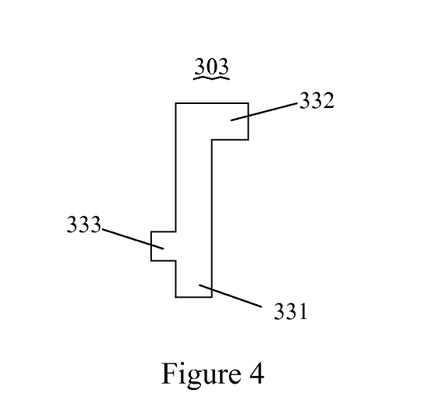
FIG. 4 is a schematic view of the structure of the abutting portion of another embodiment.

It is understood that the position piece 203 may have different structure accordingly. For example, the first strengthen portion 237 may be omitted when a low-cost structure is needed. FIG. 4 is a schematic diagram showing the structure of the position piece 303 of the backlight module 20 of another embodiment. As shown in FIG. 4, the position piece 303 includes a supporting portion 331, the fixing portion 332, and the abutting portion 333. The fixing portion 332 and the abutting portion 333 extend in an opposite direction of the supporting portion 331, and are vertical to the supporting portion 331. It is understood that the position piece 303 achieves the same positioning effect as the position piece 203 shown in FIG. 3.

Figure 5:
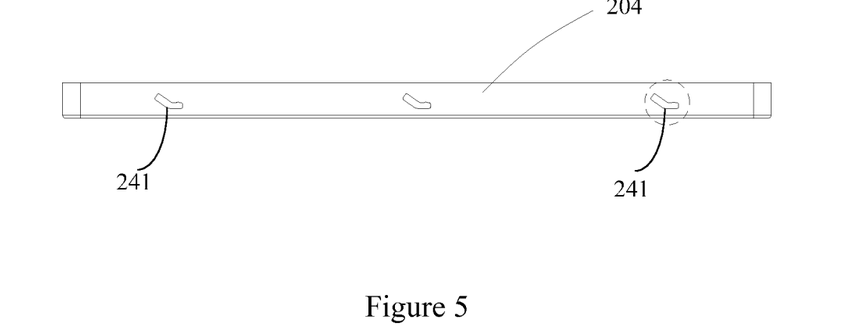
FIG. 5 is a schematic view of the structure of the sidewalls with sliding groove of the backlight module of one embodiment.

FIG. 5 is a schematic diagram showing the structure of sliding slots 241 on the sidewalls of the back frame 201. Also Referring to FIG. 2, in the embodiment, at least two sliding slots 241 are arranged in at least two opposite sidewalls 204 of the back frame 201. The location of the sliding slots 241 on two sidewalls 204 are substantially the same, and are behind the position piece 203. The pressing platform 235 of the position piece 203 stably presses the light guiding plate 202 within the back frame 201 so that the light guiding plate 202 may be reliably positioned. The concrete structure of the sliding slots 241 are shown in FIG. 6.

Figure 6:
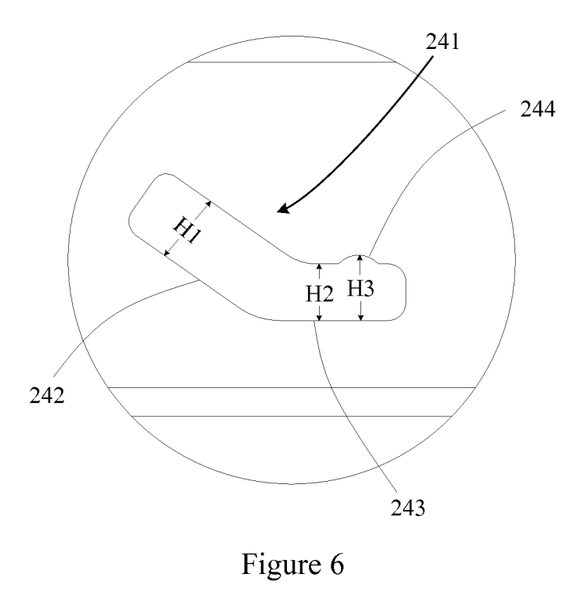
FIG. 6 is an enlarged schematic view of the structure of the sliding groove of FIG. 5.

As shown in FIG. 6, the sliding slots 241 includes a titled sliding slot 242 and a horizontal sliding slot 243 connected to an end of the titled sliding slot 242. Both of the titled sliding slot 242 and the horizontal sliding slot 243 include up edge and down edge. The distance between the up edge and the down edge defines the height of the titled sliding slot 242 (H1) and the height of the horizontal sliding slot 243 (H2). The H1 and the H2 are substantially the same and are smaller than the diameter of the protrusion 236.

In addition, in the embodiment, a groove 244 is arranged on the up edge of the horizontal sliding slot 243. The groove 244 prevents the protrusion 236 from sliding on the horizontal sliding slot 243. The groove 244 is arranged in an opposite direction toward the titled sliding slot 242, and recesses in an opposite direction toward a down edge of the horizontal sliding slot 243. The recessed portion is arc-shaped, which is substantially the same with the shape of the protrusion 236.

In the embodiment, the distance (H3) between a top of the groove 244 and a down edge of the horizontal sliding slot 243 is substantially the same with the diameter of the protrusion 236. The groove 244 engages with the titled sliding slot 242 and the horizontal sliding slot 243 so as to firmly fix the protrusion 236.

Figure 7:
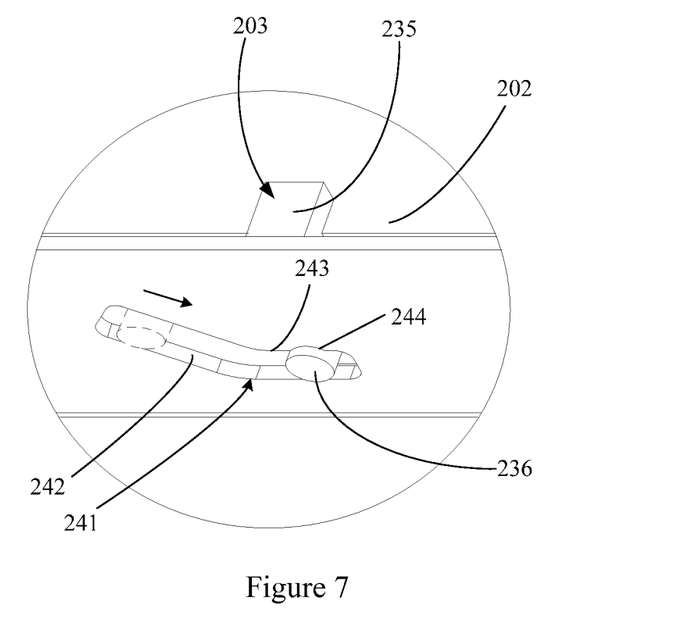
FIG. 7 is a schematic view showing the assembled position piece of the backlight module of one embodiment.

FIG. 7 is an assembled schematic diagram showing the position piece of the backlight module of one embodiment. As shown in FIG. 7, the protrusion 236 of the position piece 203 is arranged in parallel to the titled sliding slot 242 so as to put the position piece 203 in the gap between the sidewalls 204 of the backlight module 20 and the light guiding plate 202. When the protrusion 236 slides into an up edge of the titled sliding slot 242, the protrusion 236 is rotated toward the sidewalls 204 until the protrusion 236 is vertical to the titled sliding slot 242. The protrusion 236 then slides from the titled sliding slot 242, after being deformed by forces, in the direction indicated by arrow to the horizontal sliding slot 243 until sliding into the groove 244.

By the above assembling method, the location of the pressing platform 235 descends when the protrusion 236 slides from the titled sliding slot 242 toward the horizontal sliding slot 243 so that the pressing platform 235 presses on surfaces of optical components, such as the light guiding plate or the optical film. The optical components are thus firmly pressed within the back frame 201.

Figure 8:
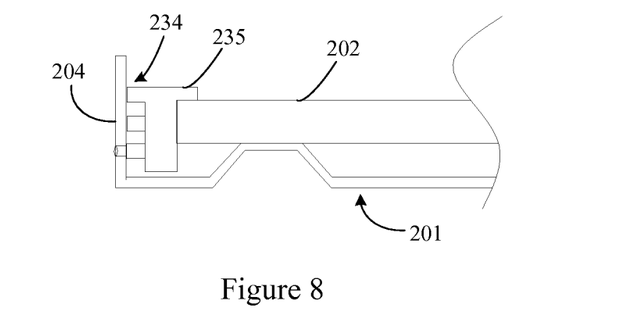
FIG. 8 is a schematic cross-sectional view of the backlight module taken along the A-A' line.

Specifically, the structure of the assembled position piece 203 is shown in FIG. 8. FIG. 8 is a schematic cross-sectional view of the backlight module of FIG. 2 along the A-A' line. As shown in FIG. 8, one side of the reinforcing portion 234 abuts the sidewalls 204. The light guiding plate 202 is disposed on the bottom surface of the back frame 201. The bottom surface of the pressing platform 235 press the edges of the top surface of the 202 press the edges of the top surface of the 202. Therefore, the back frame 201 provides an upward force to the light guiding plate 202 and the pressing platform 235 provides a downward force to the light guiding plate 202 so that the light guiding plate 202 is fixed between the pressing platform 235 and the back frame 201.

As described above, the height of the horizontal sliding slot 243 is smaller than that of the protrusion 236, and the height of the groove 244 is the same with that of the protrusion 236. In addition, the groove 244 recesses in a direction toward the up edge of the horizontal sliding slot 243. Therefore, the protrusion 236 may be slide out from the groove 244 toward the horizontal sliding slot 243 when the protrusion 236 is deformed due to downward forces. Thus, it is very difficult for the protrusion 236 to slide away from the groove 244 so as to enhance the position effect of the position piece 203.

In the embodiment, the protrusion 236 is detachably fixed on the sliding slots 241. Specifically, after being pressed, the protrusion 236 is deformed and is slid from the groove 244 toward the horizontal sliding slot 243. The protrusion 236 is rotated in response to a rotation of position piece 203 until the protrusion 236 is parallel to the horizontal sliding slot 243. The protrusion 236 then slides out from the horizontal sliding slot 243 and thus detached.

In other embodiments, the backlight module 20 further include optical films (not shown) arranged on the light guiding plate 202. The pressing platform 235 presses the edges of the top surface of the optical films.

Figure 9:
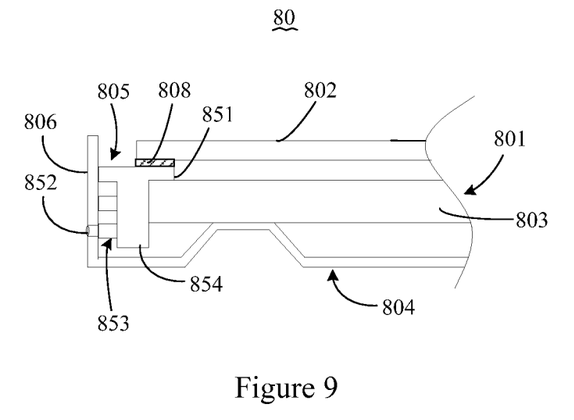
FIG. 9 is a schematic cross-sectional view of the liquid crystal device of one embodiment.

FIG. 9 is a schematic cross-sectional view of the liquid crystal display device of one embodiment. As shown in FIG. 9, the liquid crystal display 80 includes a backlight module 801 and a display panel 802. The structure of the backlight module 801 is substantially the same with the backlight module 20 shown in FIGS. 2-8.

In the embodiment, the light guiding plate 803 is received in the back frame 804. More specifically, the light guiding plate 803 is disposed on the bottom surface of the back frame 804. The bottom surface of the pressing platform 851 of the position piece 805 presses the edges of the top surface of the light guiding plate 803. The top surface of the pressing platform 851 presses the display panel 802. The top surface of the protrusion 852 of the position piece 805 supports the display panel 802. The protrusion 852 of the position piece 805 is fixed on the sidewalls 806 of the back frame 804. The edges of the strengthen portion 853 abuts the sidewalls 806. Therefore, the light guiding plate 803 is firmly pressed within the back frame 804 by the pressing platform 85.

In the embodiment, a buffer member 808 is disposed between the pressing platform 851 and the display panel 802 so as to reduce the frictions therebetween.

In view of the above, the position piece is arranged between the back frame and the light guiding plate. The position piece is detachably fixed on the sidewalls of the back frame so as to firmly press the light guiding plate within the back frame. The positioning of the light guiding plate is thus enhanced. At the same time, the position piece is detachable, and thus the assembly process is simplified.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
a back frame;
a light guiding plate received in the back frame;
a position piece arranged between the back frame and the light guiding plate, the position piece being detachably fixed on sidewalls of the back frame to firmly presses the light guiding plate within the back frame, wherein the position piece comprising a supporting portion, and a fixing portion and a abutting portion respectively arranged in opposite sides of the supporting member, the fixing portion and the abutting portion are spaced apart in an extended direction of the supporting portion and are vertically connected with the supporting portion;
the abutting portion comprising a pressing platform with a bottom surface pressing a top surface of the light guiding plate, the fixing portion comprising a protrusion detachably fixed on sliding slots on the sidewalls of the back frame;
the sliding slots comprising a titled sliding slot and a horizontal sliding slot connected to an end of the titled sliding slot; and
the position piece further comprising a reinforcing portion comprising:
a first strengthen portion being connected horizontally with the abutting portion and extending in an opposite direction with the abutting portion;
a second strengthen portion being arranged between the supporting portion and the protrusion;
a third strengthen portion being arranged in the same side of the supporting portion and between the first strengthen portion and the second strengthen portion, wherein the first strengthen portion, the second strengthen portion and the third strengthen portion being parallel and spaced apart from each other in an extended direction of the supporting portion.

2. The backlight module as claimed in claim 1, wherein a groove arranged on a top edge of the horizontal sliding slot recesses in an opposite direction toward a down edge of the horizontal sliding slot, and is arranged in an opposite direction toward the titled sliding slot.

3. A backlight module, comprising:
a back frame;
a light guiding plate received in the back frame; and
a position piece arranged between the back frame and the light guiding plate, the position piece being detachably fixed on sidewalls of the back frame to firmly press the light guiding plate within the back frame;
wherein the position piece comprising a supporting portion, and a fixing portion and a abutting portion respectively arranged in opposite sides of the supporting member, the fixing portion and the abutting portion are spaced apart in an extended direction of the supporting portion and are vertically connected with the supporting portion; and wherein the abutting portion comprising a pressing platform with a bottom surface pressing a top surface of the light guiding plate, the fixing portion comprising a protrusion detachably fixed on sliding slots on the sidewalls of the back frame.

4. The backlight module as claimed in claim 3, wherein the protrusion is made by plastic material.

5. The backlight module as claimed in claim 3, wherein the position piece further comprising a reinforcing portion comprising:
  a first strengthen portion being connected horizontally with the abutting portion and extending in an opposite direction with the abutting portion;
  a second strengthen portion being arranged between the supporting portion and the protrusion;
  a third strengthen portion being arranged in the same side of the supporting portion and between the first strengthen portion and the second strengthen portion; and
  wherein the first strengthen portion, the second strengthen portion and the third strengthen portion being parallel and spaced apart from each other in an extended direction of the supporting portion.

6. The backlight module as claimed in claim 3, wherein the sliding slots comprising a titled sliding slot and a horizontal sliding slot connected to an end of the titled sliding slot.

7. The backlight module as claimed in claim 6, wherein a groove arranged on a top edge of the horizontal sliding slot recesses in an opposite direction toward a down edge of the horizontal sliding slot, and is arranged in an opposite direction toward the titled sliding slot.

8. The backlight module as claimed in claim 7, wherein a distance between a top of the groove and a down edge of the horizontal sliding slot is substantially the same with the diameter of the protrusion.

9. The backlight module as claimed in claim 6, wherein the height of the titled sliding slot and the height of the horizontal sliding slot are substantially smaller than the diameter of the protrusion.

10. A liquid crystal display, comprising;
  a back frame;
  a light guiding plate received in the back frame;
  a position piece arranged between the back frame and the light guiding plate, the position piece being detachably fixed on sidewalls of the back frame to firmly presses the light guiding plate within the back frame; and
  a panel arranged on a top surface of the position piece;
  wherein the position piece comprising a supporting portion, and a fixing portion and a abutting portion respectively arranged in opposite sides of the supporting member, the fixing portion and the abutting portion are spaced apart in an extended direction of the supporting portion and are vertically connected with the supporting portion; and
  wherein the abutting portion comprising a pressing platform with a bottom surface pressing a top surface of the light guiding plate, the fixing portion comprising a protrusion detachably fixed on sliding slots on the sidewalls of the back frame.

11. The liquid crystal display as claimed in claim 10, wherein the protrusion is made by plastic material.

12. The liquid crystal display as claimed in claim 10, wherein the position piece further comprising a reinforcing portion comprising:
  a first strengthen portion being connected horizontally with the abutting portion and extending in an opposite direction with the abutting portion;
  a second strengthen portion being arranged between the supporting portion and the protrusion;
  a third strengthen portion being arranged in the same side of the supporting portion and between the first strengthen portion and the second strengthen portion; and
  wherein the first strengthen portion, the second strengthen portion and the third strengthen portion being parallel and spaced apart from each other in an extended direction of the supporting portion.

13. The liquid crystal display as claimed in claim 10, wherein the sliding slots comprising a titled sliding slot and a horizontal sliding slot connected to an end of the titled sliding slot.

14. The liquid crystal display as claimed in claim 13, wherein a groove arranged on a top edge of the horizontal sliding slot recesses in an opposite direction toward a down edge of the horizontal sliding slot, and is arranged in an opposite direction toward the titled sliding slot.

15. The liquid crystal display as claimed in claim 14, wherein a distance between a top of the groove and a down edge of the horizontal sliding slot is substantially the same with the diameter of the protrusion.

16. The liquid crystal display as claimed in claim 13, wherein the height of the titled sliding slot and the height of the horizontal sliding slot are substantially smaller than the diameter of the protrusion.

* * * * *